Nov. 3, 1959 W. S. PRITCHETT 2,911,591
APPARATUS FOR TESTING INSTRUMENT TRANSFORMERS
Filed Aug. 15, 1958 3 Sheets-Sheet 1
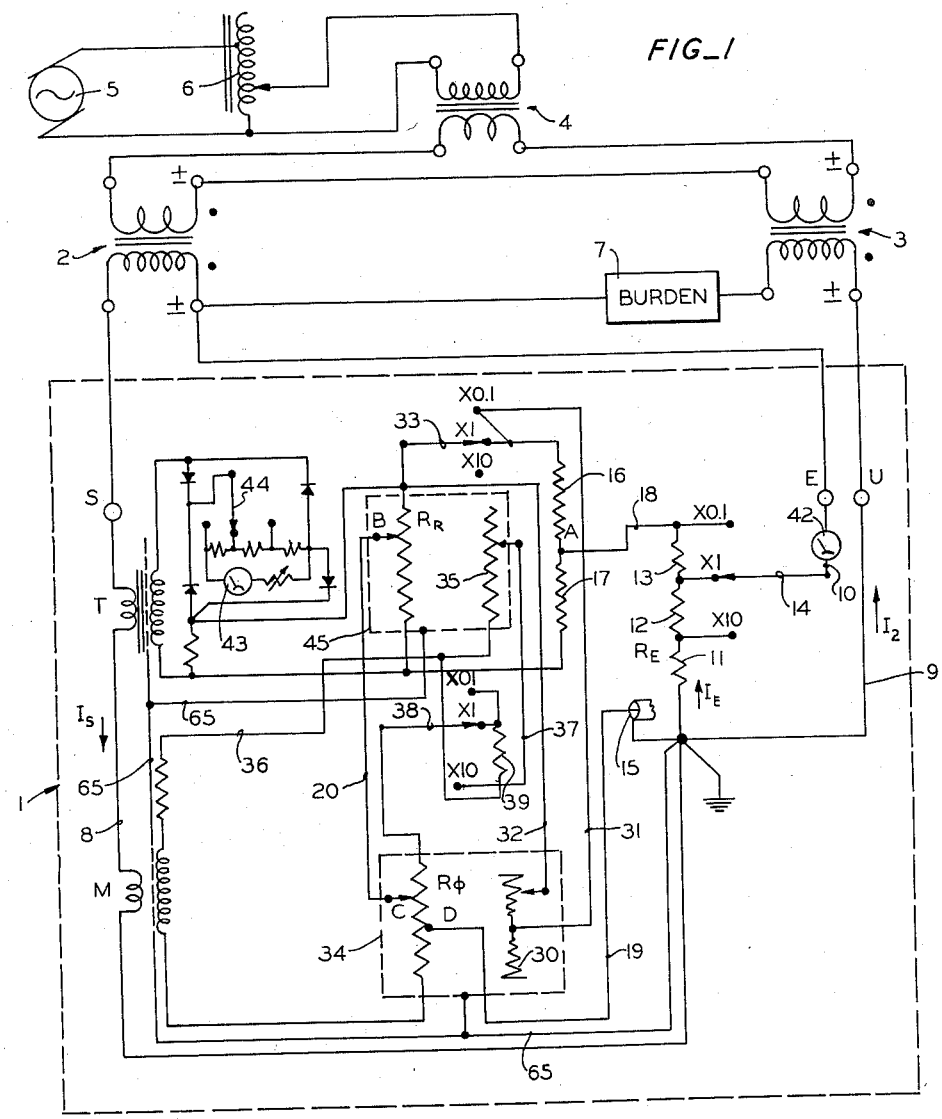
FIG_1
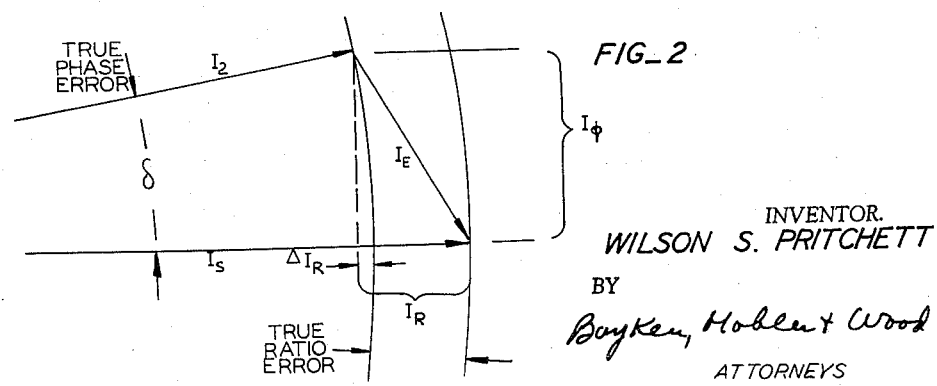
FIG_2
INVENTOR.
WILSON S. PRITCHETT
BY
Boyken, Mobler + Wood
ATTORNEYS Nov. 3, 1959     W. S. PRITCHETT     2,911,591
APPARATUS FOR TESTING INSTRUMENT TRANSFORMERS
Filed Aug. 15, 1958     3 Sheets-Sheet 2
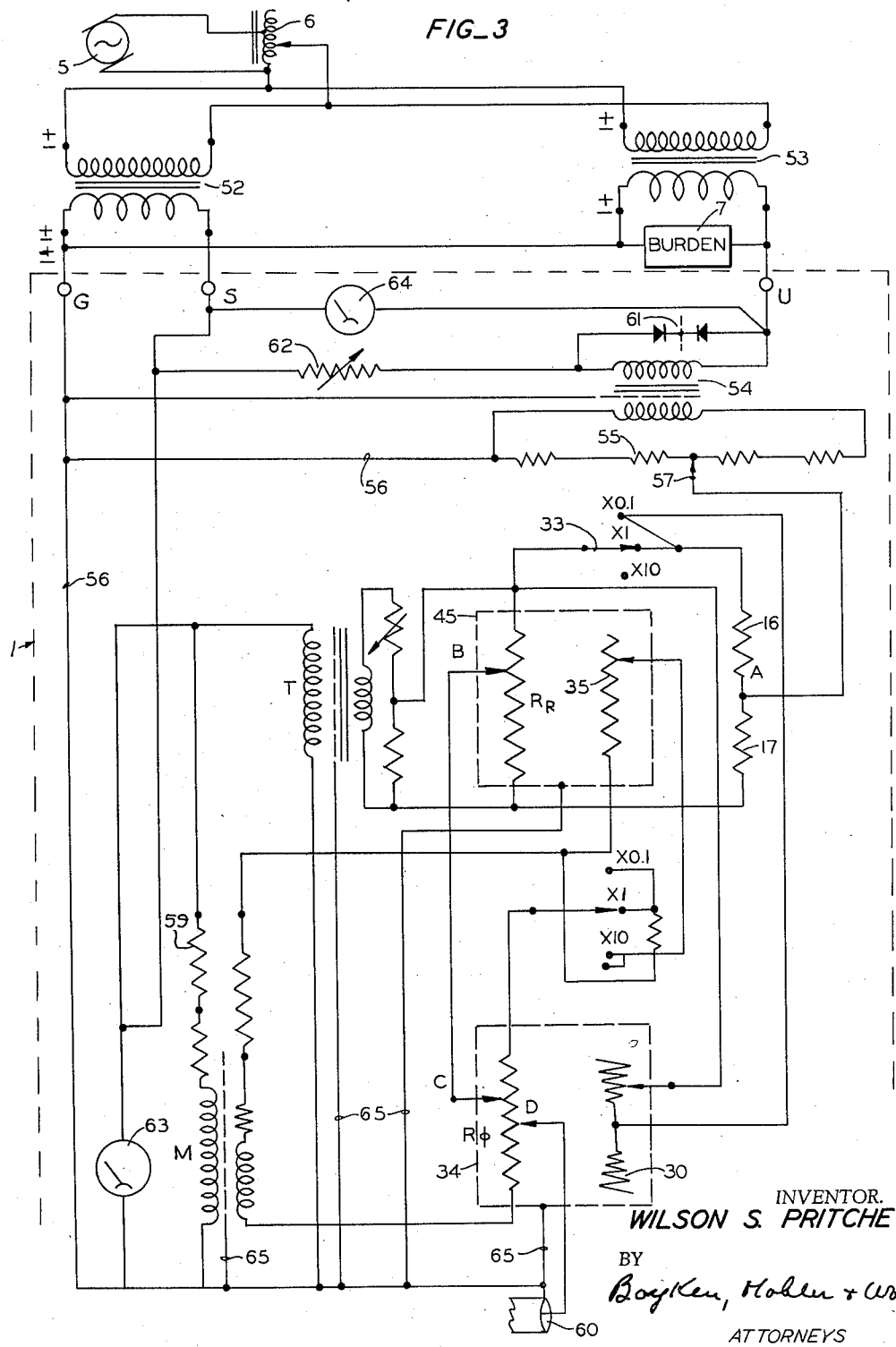
INVENTOR.
WILSON S. PRITCHETT
BY
*Boyken, Mohler & Wood*
ATTORNEYS

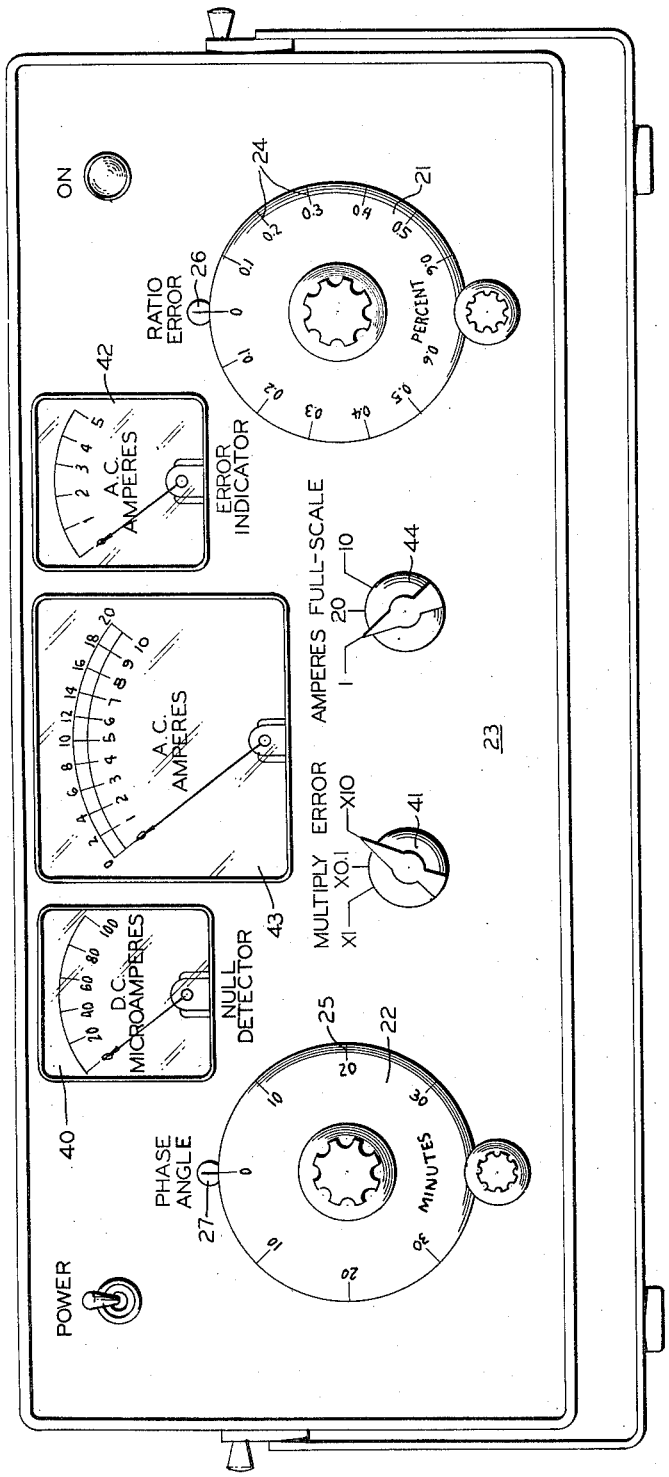
FIG_4

United States Patent Office 2,911,591
Patented Nov. 3, 1959

2,911,591

APPARATUS FOR TESTING INSTRUMENT TRANSFORMERS

Wilson S. Pritchett, Richmond, Calif., assignor to Knopp, Inc., Oakland, Calif., a corporation of California Application August 15, 1958, Serial No. 755,295

5 Claims. (Cl. 324—55)

This invention relates to apparatus for testing instrument transformers and more particularly to apparatus which employs the differential or comparative method of determining the ratio error and phase angle error of a transformer.

Heretofore, various instruments have been provided for determining ratio and phase errors of transformers by the differential or comparative method. The fundamental principle upon which such instruments operate is that of measuring two properties of the vector difference between a standard current or voltage from a standard transformer or winding and an unknown secondary current or voltage from a transformer under test. The two properties of the vector difference measured by known apparatus are the ratios of the in-phase component of the error quantity to the standard quantity and the quadrature component of the error quantity to the standard quantity. The first measurement is normally obtained as a percent and the second is interpreted as an equivalent angle.

Such measurements are, however, only approximations based on the assumption that the measured components are equal to the ratio and phase errors of the transformer which is exactly true only in the limits as they vanish.

With the increased need for accuracy in testing and rating transformers, instruments which measure only to these approximations provide only limited testing ranges. Furthermore, it has been found necessary to provide correction tables or different indices on the instrument dials to which the operator must make reference for a corrected and more accurate error indication.

It is therefore a main object of this invention to overcome the disadvantages of prior art transformer testing equipment by providing transformer comparing apparatus which automatically gives a direct reading of the true ratio and phase errors of the transformer.

Another object of this invention is the provision of transformer testing apparatus for measuring the true ratio error and phase angle of a transformer.

Still another object of this invention is the provision of apparatus for comparing the output of a transformer under test with a standard reference transformer and automatically correcting the measurement of the in-phase and quadrature components of the difference in output between said transformers so as to reflect the true ratio error and phase angle, respectively, of the transformer under test.

Other objects and advantages will become apparent from the following description taken in connection with the accompanying drawings in which:

Fig. 1 is a schematic circuit diagram of the transformer testing apparatus of this invention arranged to determine the ratio and phase errors of a current transformer;

Fig. 2 is a vector diagram illustrating the ratio and phase errors measured by the apparatus of Fig. 1;

Fig. 3 is a schematic circuit diagram of a modification of the testing apparatus of Fig. 1 arranged to measure the ratio and phase errors of a potential transformer; and, Fig. 4 is a front elevational view of an indicating and control panel for use with the apparatus of Fig. 1.

The apparatus of this invention will first be described with respect to the measurement of errors in a current transformer, but it will be understood that similar errors exist in potential transformers and may be measured by apparatus within the scope of this invention.

The ratio of the primary current to the secondary current of a current transformer is never exactly equal to the ratio of the secondary turns to the primary turns largely because the primary current includes a refected secondary current and an exciting current necessary to maintain the flux in the transformer core. Although various means are used to compensate for the turns ratio error in a transformer such compensation is never complete and errors of this type remain. Compensation to an accurate degree is also relatively expensive.

The total error in a current transformer may be expressed as a vector error current which flows in the primary but does not flow in the secondary. The formula $I_p = NI_2 + I_e$ may be used to define this relationship. This equation states that the vector primary current, $I_p$, is different from the stated turns ratio of the transformer, $N$, times the secondary current, $I_2$, by an amount that is the error component, $I_e$, of the primary current. Dividing this equation by $N$ and transposing terms results in the equation:

$$\frac{I_e}{N} = \frac{I_p}{N} - I_2$$

In this equation $I_2$ is the actual secondary current $$\frac{I_p}{N}$$

is the value the secondary current would be if there were no errors in the transformer, and $$\frac{I_e}{N}$$

is the error current referred to the secondary.

The vector diagram of Fig. 2 represents this equation in which $I_E$ has been substituted for $$\frac{I_e}{N}$$

and $I_S$ has been substituted for $$\frac{I_p}{N}$$

Referring to Fig. 1, the transformer testing apparatus proper is included within the dotted line 1 and provides means for comparing the outputs of a standard current transformer 2 and a transformer 3 under test. The primaries of current transformers 2 and 3 are connected, as shown, in series with a loading transformer 4 which receives power from an electrical power supply 5 provided with variable control means 6.

The polarity connections which are correct for the testing purpose of this application are indicated in the conventional manner. The burden 7, which is normally specified in advance for a particular transformer under test, is connected in series with either lead of the secondary of the current transformer 3 under test. The secondaries of the current transformers 2 and 3 are connected in series, as shown, to the terminals S, U, and E, respectively, of the test apparatus 1 providing a current path 8 from the secondary of standard transformer 2, a current path 9 from the secondary of unknown transformer 3, and a diagonal current path 10 across the series secondary circuit.

When connected in the manner shown and energized the standard current transformer 2 supplies a reference current, $I_S$, flowing in current path 8 and the secondary current, $I_2$, of the transformer 3 under test flows in current path 9. Transformers 2 and 3 are of the same stated ratio but the standard transformer 2 is substantially error free and therefore provides a reference current, $I_S$, which is almost exactly in phase with the primary current and which is almost exactly of the proper or rated magnitude. The difference between $I_S$ and $I_2$ resulting from a fault or error in the unknown current transformer 3 flows in the diagonal or error current path 10. This error current, $I_E$, represents the error in the unknown transformer 3 which is desired to be measured.

As previously mentioned, this invention is concerned with measuring the ratio and phase errors of the transformer 3 under test. Referring to Fig. 2, the ratio error of the transformer under test is the difference in length or magnitude between the two vectors $I_S$ and $I_2$ expressed as a fraction or as a percent of either the secondary current, $I_2$, or the reference current, $I_S$. In practice both $I_S$ and $I_2$ are nearly the same and are large enough in relation to the errors that either may be used as the denominator of the fraction. The true numerator of the ratio error fraction is indicated in Fig. 2 as "true ratio error."

The phase error of the transformer under test is the angle, $\delta$, between the secondary current vector, $I_2$, and the reference current vector, $I_S$, and denoted "true phase error." Because the reference current produced by the standard transformer 2 is exactly in phase with the primary current, $\delta$, is also the phase angle between the secondary and primary current of the transformer 3 under test.

Several conventional methods are known for measuring approximations of the ratio and phase errors. These approximations are obtained by measuring the in-phase and quadrature components, respectively, of the error current, $I_E$. These components are referred to in Fig. 2 as $I_R$ and $I_\phi$, respectively. The approximate ratio error is therefore represented as the fraction $$\frac{I_R}{I_S}$$

in which $I_R$ is the component of $I_E$ which is in phase with $I_S$.

The approximate phase error, in radians, is expressed by the fraction $$\frac{I_\phi}{I_S}$$

in which $I_\phi$ is the quadrature component of $I_E$ that is 90° or 270° out of phase with $I_S$. These approximate errors may be determined by measuring the in-phase and quadrature components of $I_E$ flowing in current path 10 of apparatus 1 or some error quantity proportional thereto.

In the apparatus of Fig. 1 an error voltage proportional to and in phase with error current $I_E$ is developed across a non-inductive resistor, $R_E$, in error current path 10. The apparatus of Fig. 1 is specially designed to test over several ranges of errors, such as the X0.1, X1, and X10 ranges, and $R_E$ may therefore include resistors 11, 12, 13 of various sizes. The range switch 14 switches one or more of the resistors 11, 12, 13 into the error current path 10 as desired. For example, resistor 11 may have a value of 0.02 ohm, resistor 12 a value of 0.18 ohm, and resistor 13 of 1.8 ohms, to provide the X10, X1, and X0.1 ranges, respectively.

The error voltage developed across $R_E$ is measured by generating locally a voltage which is equal in magnitude but opposite in phase to said error voltage and adding it electrically to said error voltage. A null detector 15, to be described, is included in the circuit in Fig. 1 to indicate equality or balance of the error voltage and said local voltage.

The locally generated voltage may be considered as having a pair of mutually perpendicular components. A current transformer, T, and a mutual inductor, M, are included in the current path 8 that carries the reference current, $I_S$. The flow of current through transformer T develops a voltage component across a parallel resistor, $R_R$, which is proportional to and very nearly either in phase with or 180° out of phase with the reference current, $I_S$. A voltage component is also developed across the resistor, $R_\phi$, which is in series with mutual inductor, M, that is proportional to and very nearly either 90° or 270° out of phase with said reference current. These components will hereinafter be referred to as the "in-phase" and "quadrature" components or voltages, respectively.

It will be noted that a pair of balanced resistors 16, 17 are connected across resistor $R_R$ and that a center tap, point A, between resistors 16, 17 is connected by wire 18 to one side of resistor $R_E$. A center tap at point D on resistor $R_\phi$ is connected by wire 19 through null detector 15 to the opposite or grounded side of resistor $R_E$.

Both resistors $R_R$ and $R_\phi$ are variable and provided with adjustable taps at points B and C respectively. A wire 20 connecting these adjustable taps completes the circuit through $R_E$. It will be noted that when the taps at B and C are respectively centered on the resistors $R_R$ and $R_\phi$ neither of the voltage components will be applied in series with $R_E$ because no voltage drop will be generated between points A and B and points C and D respectively. Upon movement of the tap at point B to one side or the other of the center of resistor $R_R$ the voltage component which is in phase with the reference current $I_S$, will be developed across that portion of $R_R$ between its center and point B. Point A corresponds to the center of resistor $R_R$ and therefore the in-phase component developed between points A and B will be proportional to the distance of the variable tap from the center of resistor $R_R$.

A similar adjustment of the quadrature component across that portion of resistor $R_\phi$ between points C and D may be accomplished by varying the position of the movable tap at C with respect to the fixed center tap at D. In this manner, both the in-phase voltage component across $R_R$ and the quadrature voltage component across $R_\phi$ may be adjusted in magnitude until they fully cancel the corresponding components of the error voltage across $R_E$. This cancelling or the balancing of the circuit is indicated by null detector 15.

The adjustable taps on resistors $R_R$ and $R_\phi$ are respectively directly connected to rotatable dials 21 (Fig. 4) and 22 on the control panel 23 of the testing apparatus of this invention. Said dials are respectively provided with peripheral markings 24, 25 which indicate the ratio and phase errors against the fixed pointers 26, 27, respectively. Preferably the markings 24, 25 are calibrated directly and because the locally generated voltages are proportional to the reference current, $I_S$, the readings are given in percent ratio error and in minutes phase error in accordance with the previous equations.

In effect, transformer T and its associated parallel resistor and mutual inductor M with its associated resistor respectively provide means for generating voltages that are in phase and in quadrature to the output of the reference transformer and opposing an error voltage, which is in proportion to and in phase with the difference in output between the standard and unknown transformers, with said generated voltages. The adjustable taps on resistors $R_R$ and $R_\phi$ provide means for adjusting the magnitude of these locally generated voltages so that they cancel the error voltage and thereby provide a direct indication from the dial means, coupled to the adjustable resistor taps, of the magnitudes of the in-phase and quadrature voltages in terms of the ratio and phase errors, respectively, of the unknown transformer.

It is obvious that the in-phase and quadrature voltages may be adjusted either positively or negatively with respect to the corresponding components of the error voltage and that the null detector 15 will give a zero indication of balance only when the locally generated components are opposing or negative with respect to the corresponding components of the error voltage. The relative positiveness or negativeness of the in-phase and quadrature voltage components will be respectively indicated on the dials 21, 22 as high or low ratio error readings and lagging or leading phase error readings. For example, Fig. 2 illustrates that the secondary current, I₂, is low and leading giving a low ratio error and a leading phase error to unknown transformer 3.

As previously mentioned, the errors measured in the above manner are approximate only since they are based on the assumption that the locally generated voltage components are equal to the corresponding ratio and phase errors. This assumption is exactly true only in the limit as the errors vanish. For finite errors, however, it will be seen in Fig. 2 that the measured component $I_R$ is slightly larger than the true ratio error where the secondary current, $I_2$, is low. It can be shown that the amount by which $$\frac{\Delta I_R}{I_S}$$

$$\frac{I_R}{I_S}$$

is incorrect, depends on the phase angle, $\delta$, and is:

$$\frac{\Delta I_R}{I_S} = 1 - \cos \delta \cong \frac{\delta^2}{2}$$

where $\delta$ is in radians.

Similarly, it can be shown that a more accurate definition of the phase error is represented by the expression:

$$\delta = \frac{I_\phi}{I_S}\left(1 \pm \frac{I_R}{I_S}\right)$$

in radians. It will be noted that the correction to the ratio error is in terms of the phase error and that the correction to the phase error is in terms of the ratio error. These latter expressions for the ratio and phase errors, which are corrected from the aforementioned approximations respectively as functions of each other, are sufficiently accurate for all practical applications in measuring errors in modern transformers to 10 percent ratio error and 400 minutes phase error.

These correcting factors are applied, in a manner and by means to be described, to decrease the approximate ratio error reading and to increase the approximate phase error reading when the secondary current, $I_2$, is low and vice versa.

The correction to the approximate ratio error reading is provided by variable resistor 30 having an adjustable tap ganged to the adjustable tap on resistor $R_\phi$ for movement therewith. A center tap on resistor 30 is connected by wire 31 to one side of the balanced resistors 16, 17 and the adjustable tap on resistor 30 is connected by wire 32 to the other side of the balanced resistors. Since resistor 30 is ganged to resistor $R_\phi$ the position of phase error dial 22 will produce a corresponding setting on resistor 30 which changes the potential of the junction A between resistors 16, 17. Because the correction to be applied $$\left(\frac{\delta^2}{2}\right)$$

is a quadratic function of the phase angle, resistor 30 is a tapered resistor and thereby provides a change in potential at point A such that the balanced setting of the ratio error dial 21 is made correct in accordance with the previously mentioned correcting increment.

By this means the in-phase voltage generating means is biased to reduce negative or low secondary current ratio error readings or increase positive or high secondary current ratio error readings toward the true or exact ratio error of the transformer being tested. In other words, the setting at balance on resistor $R_\phi$ produces a voltage between the center tap and adjustable tap of resistor 30 proportional to the square of the phase angle error which increases or reduces the setting required on resistor $R_R$ for the in-phase balance depending upon whether the secondary current is high or low.

On the lower ranges of the instrument of Fig. 1 it is not as necessary that the foregoing corrections be applied as it is in the X10 range. A three position switch 33, ganged to the range switch 10 is thereby provided in the circuit, including wire 31, with resistor 30, which switch short circuits resistor 30 on the X0.1 and X1 ranges. On the X10 range switch 33 is open so that the adjustable tap on resistor 30 is connected by wire 32 through resistor $R_R$ to the side of resistor 17 remote from resistor 16. The dotted line 34 (Fig. 1) indicates the ganged condition of resistors $R_\phi$ and 30 for the simultaneous correcting operation described.

The correction to the phase angle reading is produced by an open-ended, variable resistor 35, one end of which is connected by wire 36 through the secondary of mutual inductor M to one end of resistor $R_\phi$. The adjustable tap of resistor 35 is connected by wire 37 through a switch 38 to the other end of resistor $R_\phi$. Said adjustable tap is ganged to the tap at B on resistor $R_R$ as indicated by dotted line 45. Switch 38 is similar to switch 33 in that it is ganged to range switch 14 and closes the circuit through wire 37 to the other end of resistor $R_\phi$ only when the X10 range position.

When switch 38 is in this latter position, the position of the ratio error dial at balance produces a setting on resistor 35 biasing the quadrature generating means including resistor $R_\phi$ in a manner correcting the phase error reading in accordance with the corrected equation. In other words, the setting of the adjustable tap on resistor $R_R$ causes a voltage to be produced across resistor 35 proportional to the ratio error, which voltage is impressed on resistor $R_\phi$ increasing or decreasing the balanced setting of the adjustable tap on resistor $R_\phi$ depending upon whether the secondary current, $I_2$, is low or high.

As previously mentioned, on the X.01 and X1 ranges, where it is not as necessary to provide this latter correction, the circuit from resistor 35 is broken by switch 38 which switches into the circuit with resistor $R_\phi$ resistor 39 having half the value of resistor 35. The addition of resistor 39 on these lower ranges is necessary because a voltage is developed across half of resistor 35 and impressed on resistor $R_\phi$ when the ratio error dial is in the center or zero position and no correction is being applied.

It is seen therefore that with the instrument of this invention both the ratio and phase errors of a transformer under test may be balanced and measured at the same time by simultaneously adjusting the ratio and phase error dials 21, 22. The measurements given by said dials will automatically be correct in accordance with the previously stated corrected equations rather than necessitating references to correcting tables or different indices, as required in conventional equipment, to correct the approximate errors determined by such equipment.

A further feature of this invention is the inclusion of a special null detector 15 which affords the necessary sensitivity to give a sharp balance but provides a very low burden on the transformers under test. Null detector 15 is basically a high gain, low noise electronic amplifier operating a rectifier type voltmeter. Said null detector has moderately selective band-pass characteristics so that the differences in harmonic content of the standard and unknown transformers do not obscure the sharp balance.

Fig. 4 indicates the dial 40 of an indicating instrument operated by null detector amplifier 15 which may be suitably displayed on control panel 23. It will also be noted that the knob 41 operating ganged range switch 14, switch 33, and switch 38 is accessible on said control panel.

Control panel 23 may also display the face of a meter 42 which is connected in path 10 (Fig. 1) for giving a warning indication in the event of improper connection of transformer 3 or other abnormal condition in which a large current flows in path 10. In the illustration of Fig. 1 meter 42 may be an ammeter for indicating the magnitude of such large current; it being noted that the error current, $I_E$, in a normal transformer is too small to register on meter 42.

An ammeter 43 may also be placed in the circuit with current transformer T for measuring the reference current, $I_S$, flowing in path 8. Ammeter 43 is preferably provided with the resistive network shown, including a range switch 44, accessible on control panel 23 along with the face of ammeter 43.

Suitable shielding for the components of the apparatus herein described may be provided as indicated at 65 connected to ground.

Although the values of the resistors included in the circuit of Fig. 1 are not critical, a good design for the apparatus shown provides resistors $R_R$ and $R_\phi$ of 2,000 ohms each. Preferably, resistors 16, 17 are each half the value of resistor $R_R$ or 1,000 ohms. Resistor 35 may be 500 ohms and resistor 39, 250 ohms, which would be compatible with a resistor 30 of 350 ohms total resistance.

The potential transformer comparator, connected as shown in Fig. 3 to two potential transformers having the same nominal ratio, measures the difference in ratio and in phase angle in a manner similar to that of the current transformer comparator shown in Fig. 1. The differences in the apparatus of Fig. 3 exist by reason of the fact that the difference in output between the standard potential transformer 52 and the potential transformer 53 under test is provided as an error voltage which may be directly balanced against the in-phase and quadrature components of a locally generated voltage to measure the ratio and phase error, respectively, in the manner described.

The error voltage between the two transformers exists between terminals marked S and U. The transformer 54 and the error resistor bank 55 develop a voltage between points 56 and 57 proportional to and in phase with the actual error voltage. Resistor 62 affords calibrating adjustments of this voltage.

The mutual inductor, M, together with the series resistor 59 causes a voltage either 90° or 270° out of phase with the reference voltage between the points marked S and G to be impressed upon the resistor $R_\phi$. This voltage is also proportional in magnitude to the reference voltage. The potential transformer T causes a voltage either in phase or 180° out of phase with the reference voltage to be impressed upon resistor $R_R$. This voltage is also proportional in magnitude to the reference voltage.

The voltage between points A and B and between points C and D, as they were in the apparatus of Fig. 1, are seen to be connected in series with the voltage developed across the error resistor bank 55 between points 56 and 57 and the input to the null detector 60 which is similar to null detector 15. As far as the error measuring circuit is concerned Fig. 4 is identical to Fig. 1 and like reference numerals are used. Therefore, after adjusting dials attached to $R_R$ and $R_\phi$ for a minimum reading on the null detector the dial indexes will read respectively the ratio error in percent and the phase angle in minutes. These readings will also be corrected by means of resistors 30 and 35, respectively, as before described with reference to Fig. 1.

The purpose of the voltmeter 63 is to indicate the reference voltage and the purpose of the error voltage indicator 64 is to warn the operator of improper connections or of a fault in transformer 53. During normal testing the error voltage indicator 64 will produce only imperceptible deflections. The diodes 61 and the resistor 62 protect the transformer 54 from overvoltage during abnormal operation.

I claim:

1. In apparatus for comparing the output of an unknown transformer under test and a standard transformer in which an error voltage proportional to and in phase with the difference in output between said transformers is generated, the improvement, comprising: means for generating a pair of local voltages respectively in phase and in quadrature to the output of said standard transformer and opposing said error voltage with the same, means connected to each said generating means for adjusting the magnitude of said local voltages and including indicator means coupled thereto for indicating said magnitudes in terms of ratio error and phase error, respectively, of said unknown transformer, and means coupled with said quadrature voltage adjusting means for biasing said in-phase voltage generating means as a function of said quadrature voltage for correcting the ratio error indication toward the true ratio error.

2. In apparatus for comparing the output of an unknown transformer under test and a standard transformer in which an error voltage proportional to and in phase with the difference in output between said transformers is generated, the improvement, comprising: means for generating a pair of local voltages respectively in phase and in quadrature to the output of said standard transformer and opposing said error voltage with the same, means connected to each said generating means for adjusting the magnitude of said local voltages and including indicator means coupled thereto for indicating said magnitudes in terms of ratio error and phase error, respectively, of said unknown transformer, and means respectively coupled with said quadrature voltage and in-phase voltage adjusting means for respectively biasing said in-phase and said quadrature voltage generating means as functions of said quadrature and in-phase voltages, respectively, for respectively correcting the ratio error and phase error indications toward their true values.

3. In apparatus for comparing the output of an unknown transformer under test and a standard transformer in which an error voltage proportional to and in phase with the difference in output between said transformers is generated, the improvement, comprising: means for generating a pair of local voltages respectively in phase and in quadrature to the output of said standard transformer and opposing said error voltage with the same, means connected to each of said generating means for adjusting the magnitude of said local voltages and including indicator means coupled thereto for indicating said magnitudes in terms of ratio error and phase error, respectively, of said unknown transformer, means coupled with said quadrature voltage adjusting means for biasing said in-phase voltage generating means as a quadratic function of said quadrature voltage and means coupled with said in-phase voltage adjusting means for biasing said quadrature voltage generating means in proportion to said in-phase voltage for respectively correcting the ratio error and phase error indications toward their true values.

4. Apparatus for comparing the outputs of an unknown transformer and a standard transformer, comprising: means connecting said transformers including a path for carrying the error quantity that is the difference in output between said transformers and means for generating an error voltage proportional to and in phase with said error quantity, means for generating an opposing voltage having an in-phase component and a quadrature component in relation to the output of said standard transformer and for electrically cancelling said error voltage with said opposing voltage, control means connected to said opposing voltage generating means for adjusting said components to magnitudes equal to the corresponding components of said error voltage and including dials indicating said magnitudes in terms of the ratio and phase errors, respectively, of said unknown transformer, and means coupled with said quadrature component control means for changing the magnitude of the component of said error voltage corresponding to said in-phase component by an amount substantially proportional to unity less the cosine of the phase error angle.

5. Apparatus for comparing the outputs of an unknown transformer and a standard transformer, comprising: means connecting said transformers including a path for carrying the error quantity that is the difference in output between said transformers and means for generating an error voltage proportional to and in phase with said error quantity, means for generating an opposing voltage having an in-phase component and a quadrature component in relation to the output of said standard transformer and for electrically cancelling said error voltage with said opposing voltage, control means connected to said opposing voltage generating means for adjusting said components to magnitudes equal to the corresponding components of said error voltage and including dials indicating said magnitudes in terms of the ratio and phase errors, respectively, of said unknown transformer, and means coupled with said quadrature component control means for changing the magnitude of the component of said error voltage corresponding to said in-phase component by an amount substantially proportional to unity less the cosine of the phase error angle, and means coupled with said in-phase component control means for changing magnitude of the component of said error voltage corresponding to said quadrature component by an amount proportional to the product of the ratio error and the phase error.

References Cited in the file of this patent

UNITED STATES PATENTS

| | | |
|---|---|---|
| 2,566,140 | Petch | Aug. 28, 1951 |
| 2,666,895 | Knopp | Jan. 19, 1954 |

OTHER REFERENCES

Knowles et al.: "Precision Bridges for Instrument Testing," General Electric Review, November 1951, pp. 14–17.